Figure 1:
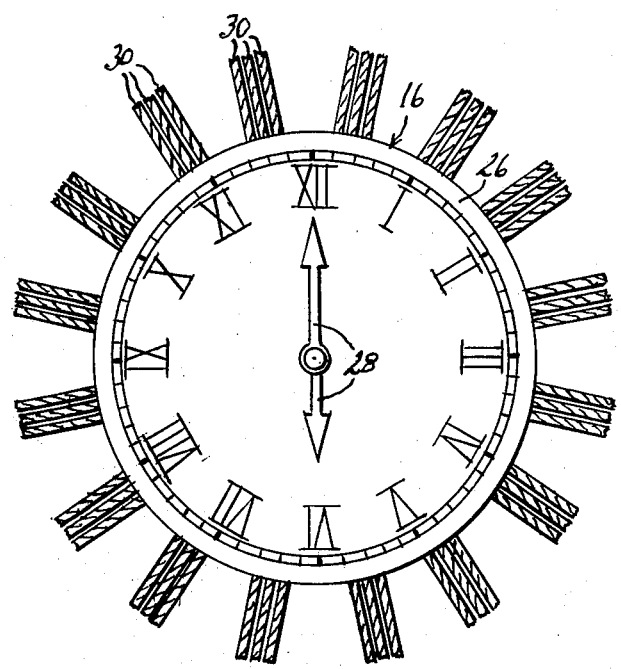

United States Patent [19]

Hoover

[11] 4,285,608

[45] Aug. 25, 1981

[54] ORNAMENT MOUNTING BRACKET FOR MACRAME DESIGNS

[76] Inventor: Calvin E. Hoover, 6715 Verde Dr., Kansas City, Kans. 66104

[21] Appl. No.: 111,895

[22] Filed: Jan. 14, 1980

[51] Int. Cl.$^3$ .............................. F16D 9/00; F16P 5/00
[52] U.S. Cl. ................................. 403/002; 38/102.2; 289/16.5
[58] Field of Search ................... 289/16.5, 18.1, 10; 38/102.2, 102.91; 403/2, 360; 285/DIG. 22

[56] References Cited

U.S. PATENT DOCUMENTS

| 519,258 | 5/1894 | Hill | 38/102.2 |
|---|---|---|---|
| 1,199,952 | 10/1916 | Wedoo | 38/102.2 |
| 1,357,737 | 11/1920 | Solani | 38/102.2 |

*Primary Examiner*—Wayne L. Shedd

[57] ABSTRACT

An ornament mounting bracket for macrame designs consisting of a plate on which any desired ornament may be removably mounted, and a ring in which macrame cords may be tied to originate a design, and provisions by which the plate may be removably snap-fitted into the ring to mount the ornament in the design.

8 Claims, 3 Drawing Figures

ORNAMENT MOUNTING BRACKET FOR MACRAME DESIGNS

This invention relates to new and useful improvements related to the craft of macrame, and has particular reference to a new and novel bracket by means of which nearly any ornament, not in itself macrame, may be mounted in an overall macrame pattern to form a design element thereof.

In the macrame art, it is common practice to originate a pattern of ornamentally knotted cords, this of course being the essence of the macrame concept, at some central ornament, such as a clock or the like, the pattern progressing outwardly from the central ornament as the knot tying progresses. In this manner, a very attractive ornamental mat, with the ornament as the focal point of interest, may be formed. The patterns which may be formed by variations in the knotting are virtually limitless, and the mat may be quite beautiful, and of any desired area. If the mat is to be used as a wall hanging, the use of a clock as the central ornament is quite popular, but other ornaments, such as ceramic tiles, painted or carved wooden plaques, and many others, are also common.

However certain difficulties are commonly experienced in the formation of macrame designs originating at a central ornament and progressing outwardly therefrom as the knotting proceeds. If the cords are connected permanently to the ornament as an initial step in the process, then the ornament must remain in place during the entire knotting process. Since the knotting process requires much time and possibly rough manual handling, this may result in damage to or breakage of the ornament, particularly if said ornament is delicate or fragile, which many are. Also, such permanent attachment of the ornament prevents its later removal for repair, servicing or replacement, as may frequently be necessary particularly if the ornament constitutes a clock.

Accordingly, the primary object of the present invention is the provision of an ornament mounting bracket which overcomes the above difficulties, in that it eliminates any necessity that the ornament be kept in place as the macrame design is formed, and permits the ornament, once fixed in place, to be removed at any time for servicing or replacement. To this end, the bracket consists of a ring to which the macrame cords may be tied to originate the design, and which may serve as the sole anchor for the cords until the design is completed, and a plate, on which the ornament itself may be mounted, operable to be firmly but detachably engaged in said ring.

Another object is the provision of a mounting bracket of the character described which is adapted to serve additionally as an aid in the formation of the macrame design itself, as in dividing and maintaining the possibly large number of cords secured in the ring in discrete groups, as is often necessary or desirable when starting a macrame design.

Other objects are extreme simplicity and economy of construction, and efficiency and dependability of operation.

Figure 3:
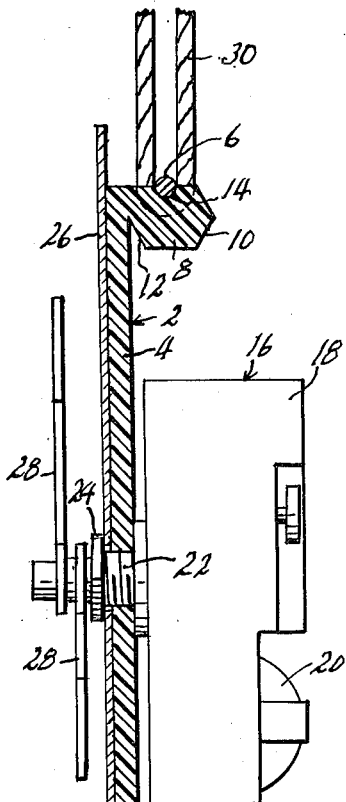
Figure 2:
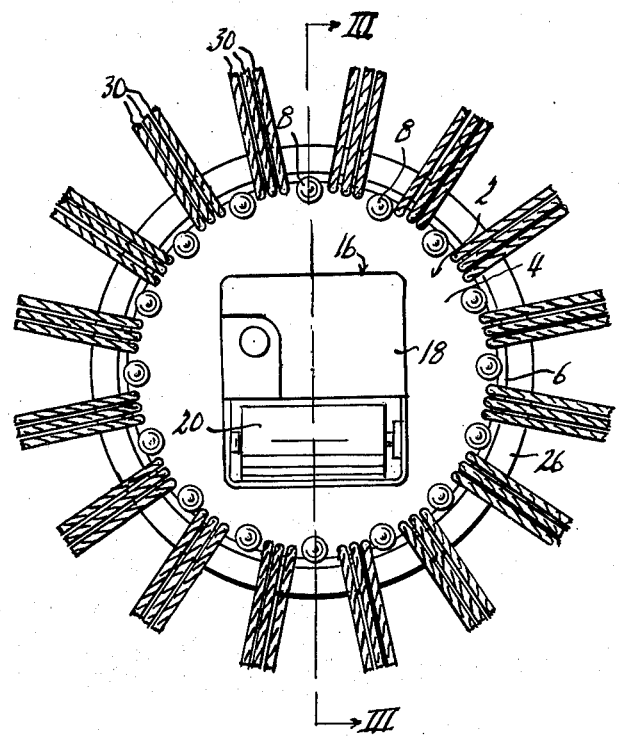

With these objects in view, as well as other objects which will appear in the course of the specification, reference will be had to the accompanying drawing, wherein:

FIG. 1 is a fragmentary front elevational view of a macrame design, showing a clock mounted therein as an ornament by means of a mounting bracket embodying the present invention, FIG. 2 is a rear elevational view of the parts shown in FIG. 1, showing the mounting bracket itself, and FIG. 3 is an enlarged sectional view taken on line III—III of FIG. 2, with parts left in elevation.

Like reference numerals apply to similar parts throughout the several views, and the numeral 2 applies generally to a mounting bracket embodying the present invention, and shown in FIGS. 2 and 3. Said bracket comprises a plate 4 and a ring 6. Plate 4 is illustrated as circular, in view of the popularity of circular ornaments for macrame designs, but it could be of polygonal and other shapes as well, and is preferably formed of plastic or other suitable material having a substantial degree of resilient yieldability, for reasons which will presently appear. Formed integrally with and extending rearwardly from the plate are a series of short studs or posts 8, said studs being spaced apart regularly about the periphery of the plate and being of equal length. Their rearward ends are tapered as shown at 10 in FIG. 3, and each stud is weakened at its juncture with the body portion of the plate by means of a notch 12 formed therein, whereby it may be broken free from the plate by substantial physical force applied thereto.

Ring 6 is formed of heavy spring wire or rod, and is endless. The plate 4 is adapted to be assembled with said ring by inserting the studs into said ring as shown. For this purpose, the ring is formed with an internal diameter generally equal to the diameter of the ring defined in skeleton form by the outer edges of the studs, with a degree of interference amounting to a fraction of the diameter of the wire or rod of which ring 6 is formed. Each stud is provided intermediate its ends with a notch 14 into which the ring may snap. Thus when the ring is pressed firmly forwardly over the studs, the pressure thereof against the tapered ends 10 of the studs causes the latter to yield resiliently inwardly so that the ring may pass around the outer edges of the studs. The resilience of the studs then snaps them outwardly to engage notches 14 with the ring, so that plate 4 and ring 6 are firmly assembled. They may be disengaged from each other by exerting a rearward force on the ring relative to the plate. As previously mentioned, the illustrated circular shape of the plate and the ring is exemplary only. They may be of any desired shape, so long as the pattern of studs 8 corresponds to the shape and size of the ring.

The ornament selected for illustration in connection with the bracket, which is also by way example only, constitutes an electric clock 16 including a casing 18 disposed behind plate 4 and carrying an electric motor powered by a dry cell battery 20. Said casing is provided with a tubular hub 22 which extends forwardly through a bore provided therefor centrally in plate 4. Said hub is externally threaded, and is secured in place by a nut 24 threaded thereon forwardly of the plate, said nut also securing a suitable clock dial 26 to the front surface of plate 4. Spindless projecting through the hub are adapted to receive clock hands 28 thereon after nut 24 has been tightened. It will be understood however, that plate 4 may be bored or otherwise adapted to receive and mount many other types of ornaments than clock 16, and that the forward surface of said plate could itself be carved, painted, or otherwise decorated to serve directly as an ornament.

In the use of the bracket, ring 6 may be disengaged from studs 8 of plate 4 as previously described, and a macrame design started by looping or typing macrame cords 30, usually a large number of such cords, through said ring as shown. The design extends further and further from the ring as the decorative knots characteristic of the macrame craft are tied and it may of course be formed in any desired pattern, and extended to any size and shape. It will of course be understood that the drawing shows only the portion of the cords closest to the ring, as the pattern, size and shape of the design are not pertinent to the present invention.

In many cases, it may be necessary or desirable to the formation of the design that the possibly numerous cords 30 engaged in ring 6 be divided into and retained in discrete groups spaced about the periphery of the ring as work on the design is started. For this purpose, the plate may be engaged in the ring, so that studs 8 serve as dividers, as shown. However, the ornament, such as clock 16, should not be mounted on the plate at this time. Otherwise, the possibly rough handling to which the plate will be very likely to be subjected during the tying of the design could result in damage to the ornament. This would of course be particularly true where the ornament is delicate or fragile, as in the case of a clock. If for any particular macrame design contemplated not all of studs 8 are required, or could actually interfere with the formation of the desired design, then those studs not required may simply be broken away by the application of a substantial outward force to each. Any plastic or other material of which the plate and studs are formed should be sufficiently frangible that the studs may be broken away in this manner, when weakened by notches 12 thereof as shown. Of course, when breaking the studs away, care should be taken to leave the minimum number of studs necessary to permit secure mounting of the ring thereon in fixed relation of plate 4. If the ring is circular as shown, a minimum of three widely spaced studs is sufficient. For rings of other shapes, other minimum numbers of studs may be required.

After the macrame design is completed, the ornament such as clock 16 is then mounted on plate 4, first removing said plate from ring 6 if it has previously been inserted into said ring. The plate, with the ornament mounted thereon, is the re-engaged in ring 6, and the mounting is complete. The ornament itself, which as stated may be delicate or fragile, need never have been subjected to rough handling, and may be simply removed at any time for servicing, repair or replacement, as may be necessary particularly if it constitutes a clock as shown. Also, the described mounting permits changing of one ornament for another whenever this may be desired, since plate 4 may readily be bored or otherwise adapted to carry nearly any ornament. It is generally desirable, though by no means essential, that any ornament used include an element, such as clock dial 26, which is larger in planar dimensions than plate 4, so as to project beyond the edges of said plate. When it does so, it conceals not only plate 4, but also ring 6 and the attachments of cords 30 to said ring.

While I have shown and described a specfic embodiment of my invention, it will be readily apparent that many minor changes of structure and operation could be made without departing from the spirit of the invention.

What I claim as new and desire to protect by Letters Patent is:

1. An ornament mounting bracket for macrame designs comprising:
   a. a flat plate having forward and rearward surfaces and adapted to mount an ornament on its forward surface,
   b. an open ring usually disposed in a plane spaced behind and parallel to the rearward surface of said plate, and adapted to have macrame cords secured therein, and
   c. connecting means operable to secure said ring to said plate in said usual relationship thereto.

2. A bracket as recited in claim 1 wherein said connecting means comprises a series of studs affixed to the rearward surface of said plate and projecting rearwardly therefrom, said studs being arranged in a pattern defining in outline form, a loop corresponding to the shape of ring, and of such relationship to the size of said ring that said studs may be pressed rearwardly into frictional engagement with said ring, whereby said ring is releasably attached to said plate.

3. A bracket as recited in claim 2 wherein each of said studs is weakened at its juncture with said plate, and is formed of a material capable of being broken at said weakened juncture by the application of substantial manual force therto whereby any studs not required in any particular case may be broken away and discarded.

4. A bracket as recited in claim 2 wherein the outer edges of said studs define a loop slightly larger than the internal diameter of said ring, and wherein said studs are laterally resiliently yieldable, whereby said studs are deflected resiliently inwardly as they are inserted into said ring.

5. A bracket as recited in claim 4 wherein the rearward ends of said studs are tapered, whereby to facilitate their insertion into said ring.

6. A bracket as recited in claim 4 wherein each of said studs is provided, intermediate the ends of its outer edge, with a lateral notch adapted to be moved outwardly into engagement with said ring by the elastic recovery of said studs after said studs have been partially inserted into said ring.

7. A bracket as defined in claim 6 wherein said ring is formed of a circular rod, and wherein the lateral notches of said studs have a depth no greater than half of the diameter of said rod, whereby said ring may be disengaged from said studs by pressing it rearwardly relative to said studs.

8. A bracket as recited in claim 1 wherein said connecting means comprises a series of studs formed integrally with said plate of a resilient material and projecting rearwardly therefrom, said studs being arranged in a pattern forming, in outline form, a loop corresponding to the shape of said ring, the loop defined by their outer edges being slightly larger than the internal diameter of said ring whereby said studs are deflected inwardly when inserted through said ring, each of said studs having a lateral notch formed in the outer edge thereof intermediate its ends, said notches being outwardly movable to engage said ring by the elastic recovery of said studs after they have been partially inserted into the ring, each of said studs being tapered at its rearward end to facilitate said insertion, and having a weakening notch formed therein at its juncture with said plate, whereby any studs not required in any particular case may be broken away by the application of substantial manual force laterally thereto.

\* \* \* \* \*